W. THOMSON.
Electric Telegraph Recorder.
No. 109,688. Patented Nov. 29, 1870.
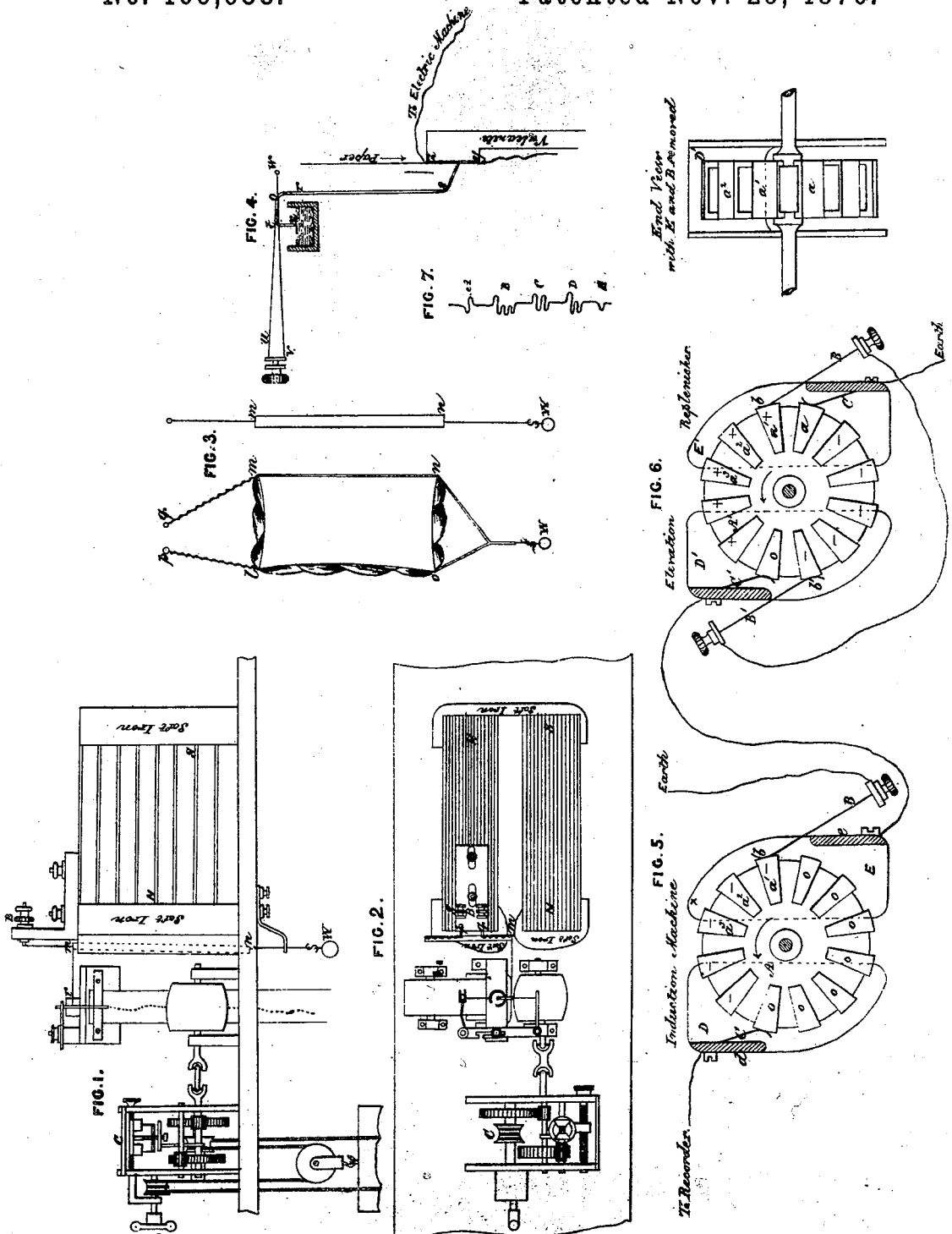

United States Patent Office.

WILLIAM THOMSON, OF GLASGOW, SCOTLAND.

Letters Patent No. 109,688, dated November 29, 1870.

IMPROVEMENT IN RECORDING INSTRUMENTS FOR THE ELECTRIC TELEGRAPH.

The Schedule referred to in these Letters Patent and making part of the same.

*To all to whom it may concern:*

Be it known that I, SIR WILLIAM THOMSON, knight, of Glasgow college, doctor of laws and professor of natural philosophy in the University and College of Glasgow, a subject of the Queen of Great Britain, have invented or discovered new and useful "Improvements in Receiving or Recording Instruments for Electric Telegraphs;" and I, the said WILLIAM THOMSON, do hereby declare the nature of the said invention, and in what manner the same is to be performed, to be particularly described and ascertained in and by the following statement thereof. That is to say, This invention has more especially for its object to produce an instrument capable of recording by permanent marks such electric signals as have, up to the present time, been received by the mirror-galvanometer invented by me. The peculiar merit of that instrument is that it continuously indicates, with approximate exactitude, the variations of strength in the received current. The movement of the spot of light follows every variation in that current, and these varying strengths, being followed by the eye, can be interpreted under circumstances in which ordinary instruments, indicating the mere presence or absence of a given strength of current, would be useless.

By my present improvements I am enable to construct an instrument which draws or marks on a strip of paper a curved or broken line, giving a graphic representation of the varying strength of current; or, if required, of electric potential at the receiving end of the cable, and gives a permanent record of every feature of the effect due to the sender's action.

The instrument is available for the system of varying strength, including, of course, the simplest system, viz: of two strengths, often called positive and negative; or for the system of long and short signals, of which the Morse alphabet is the simplest type.

The difficulty in producing such a recorder as this has been due to the difficulty of obtaining marks from a very light body in rapid motion without impeding that motion. To effect this, I, according to my invention, connect (either by direct attachment or by a stretched thread or fiber) to the body moved by the received current a light marking-needle or tube, from the end of which ink or other fluid is spurted upon paper. (The signals which are to be recorded give rise to motions of the marking end, which are parallel to the plane of the paper, while the paper is drawn along in its own plane, and in a direction perpendicular to the line of the motions caused by the signals.) I employ for the marking-needle, by preference, a capillary tube or a bristle, dipping at one end into a stationary reservoir of ink or other fluid, and I cause the ink or other fluid to be spurted from or drawn from the opposite end by means of an electric force, or by means of rapid vibrations maintained in the needle or in the paper in a direction perpendicular to the plane of the paper. These vibrations may be maintained mechanically or pneumatically, as by the agency of sound, so that the paper receives ink by a succession of fine contacts, between each of which the tube or bristle is quite free to move.

When the electric method is used, the paper is drawn over a metal plate, electrified, say, positively, and the capillary tube is electrified, say, negatively, and a powerful difference of potential is maintained between the tube and the metal plate, such as would tend to cause a succession of sparks to pass between them, and which in the circumstances produce a fine stream of ink, or a succession of fine dots spurted from the tube onto the paper, leaving a record of the position of the tube at each instant, and drawing a sensibly continuous line on the paper without impeding, by friction, the motion of the tube as directed by the receiving instrument.

I prefer to let the paper move in a vertical plane, and to use a small glass siphon, with its short leg dipping in the ink-reservoir and its long leg pointing obliquely downward at the paper, and close to it.

A similar effect is produced by the alternative methods described.

In connection with the above I use, as a receiving instrument, a peculiar arrangement, in which the received current passes through a very light coil of a small number of turns of fine wire. Part of this coil is placed in a very powerful magnetic field, produced by permanent magnets or electro-magnets, which act with great force on the coil when the current passes through it. The coil is kept stiff, without any complete frame-work or bobbin, by the use of stiff pieces (like booms in the rigging of a ship) drawn asunder by threads or strong fibers stretched to fixed points, and serving to support the coil while giving it the requisite freedom to move and the requisite stability; and In order that my said invention may be most fully understood and readily carried into effect, I will proceed to describe the drawing hereunto annexed.

Description of the Drawing.

Figure 1 is an elevation, and

Figure 2, a plan, showing the principal parts of the recording instrument.

A permanent compound steel magnet, N S, made, for convenience' sake, of a large number of straight steel bars, with a soft-iron junction-piece and soft-iron poles, is used to produce a very intense magnetic field in the deep narrow space separating the poles, shown in plan at *m*, fig. 2.

Figure 3 shows an elevation of a very light coil or skein of fine silk-covered copper wire, stretched on a couple of light struts or booms between $l\,m$ and $o\,n$.

The side $m\,n$, composed solely of the fine wire, is formed into a thin, flat cake by being cemented with paraffine.

The side $l\,o$ is strengthened by a strong thread, to relieve the copper wire from strain, and the axis of suspension is placed nearer the strengthened side, as shown in the drawing.

The coil is suspended by two fine silk fibers, $l\,p$ and $m\,q$, in such a position that the side $m\,n$ hangs in the intense magnetic field between the poles of the large permanent magnet, and is free to oscillate in a direction parallel to the straight bars forming the magnets.

The weight $w$, hung from the bottom of the coil, keeps it in shape, and adds directing-force to the coil, since any oscillation of the bifilar suspension will slightly lift this weight.

The peculiar construction of the coil reduces the momentum of the moving parts to a minimum. The form of the side $m\,n$, as a thin, flat strip, allows the poles of the permanent magnet to approach very closely, to form a very intense magnet-field, and the depth of the side $m\,n$ exposes a considerable length of the wire in the coil to the action of the magnetism of the permanent magnets.

I have obtained good results with copper wire weighing about one-quarter grain per foot, and with coils containing about twenty turns.

The two ends of the wire forming the coil are twisted round the suspending fibers, one round each, as shown in fig. 3, and attached to terminals, B B, fig. 2, and the received current, conveying the signals to be recorded, is passed through the suspended coil from these terminals.

So long as no current circulates through the coil it will hang directed solely by the bifilar suspension, and unaffected by the presence of the powerful magnets; but as soon as a current is received through the side $m\,n$ of the coil, it will be impelled out from between the poles, or further in between them, in a direction parallel to the straight bars of the magnets. The direction of the impulse will depend on the direction of the current, and the magnitude of the deflecting-force will depend, *cæteris paribus*, on the strength of the received current.

The side $m\,n$ of the coil will move backward or forward under the effect of the continually varying currents received through a submarine cable, and owing to the lightness of the coil, it will follow rapidly-varying currents, so that at each moment its position will correspond to the strength of the current at that instant. To do this, the directing force of the bifilar suspension and weight should be adjusted so that the free oscillations of the coil when no current is passing are more rapid than the oscillations intended to be recorded as signals.

The adjustment of the natural oscillations to the rate of signaling is facilitated by the use of a damper, which will allow the adoption of a smaller directing power, and consequent greater range of deflection in the marking point.

Any of the usual forms of damper might be used, founded on the friction of solids or fluids. Thus, a vane dipping in water may be employed; but good results have been obtained by allowing a small spring to press on the fiber $r\,m$ to damp the vibrations.

The receiving-coil follows the received current as readily as the little mirror and magnet in my reflecting galvanometer; but the same current in my new instrument produces a much greater available force to move the parts, and I can make use of this increase of force to allow a recording apparatus to be combined with the receiving-coil, in the following manner:

A single silk fiber, $m\,r$, is attached at one end to the coil at the top of the side $m\,n$, and at the other end to what I call the siphon of the recording instrument, shown in detail, and of full size, in Figure 4, and lettered $t\,r\,s$.

The siphon is suspended with double threads, $t\,u\,x$ $v$, at one side, and a single thread, $v\,u$, at the other side, so as to be capable of oscillating round a horizontal axis.

The directing force of the double threads is adjusted so that the siphon can follow the movements of the side $m\,n$, to which it is attached, keeping the single fiber $r\,m$ always taut.

The distance of the point of attachment $r$ from the axis $t\,w$ may be about one-tenth the length of the long leg of the siphon, so that any motion of the side $m\,n$ of the receiving-coil may be represented by a ten-fold greater motion at the end of the siphon. I use as a siphon a fine glass tube bent into the shape shown in fig. 4, which also shows the paper on which the signals are to be recorded. This paper moves past the end in a direction perpendicular to that in which the end moves to indicate the signals. The short leg of the siphon dips into a dish of ink.

A brass plate, $z\,y$, across which the paper is drawn in front of the end of the siphon, is connected with an electrical-machine, by which it is kept highly charged with electricity, whereas the siphon is in connection with the earth, and a series of small and rapid discharges of electricity takes place between the siphon and the plate, which causes the ink to be spirted from the siphon onto the paper.

The instrument should be so adjusted that the siphon will oscillate freely in a direction parallel to the plane of the paper from twice to ten times in the time occupied in the production of every wave or signal or separate part of a letter.

The ordinary electrical-machine or Ruhmkorff's coils might be used, but I prefer to use my new induction-apparatus, which can be conveniently driven by the clock-work used to supply the recording-paper, which may be of ordinary construction. It is clearly shown at C, in figs. 1 and 2.

The following is a description of the induction-apparatus:

A wheel of vulcanite, A A, fig. 5, with a number of pieces of metal, $a\ a^1\ a^2$, &c., (called carriers for brevity,) attached to its rim, is kept rotating rapidly round a fixed axis.

The carriers are very lightly touched at opposite ends of a diameter by two fixed tangent springs. One of these springs, B, is connected with the earth, and the other, C, with an insulated piece of metal, D, called the receiver, which is analogous to the "prime-conductor" of an ordinary electric-machine.

The point of contact, $b$, of the earth-spring with the carriers is exposed to the influence of an electrified body, E, called the conductor. When this is positively electrified, each carrier, when leaving the contact with the earth-spring, carries away negative electricity, which it gives up through the receiver-spring to the receiver. The receiver and inductor are each placed so as to surround, as nearly as may be, the point of contact of the corresponding spring.

In fig. 5 the receiver and inductor are cut through at $e$ and $d$ to show the carriers and contacts.

From this description it will be seen that the inductor induces a negative charge on all the carriers inside it, and each carrier, in succession, gives up this negative charge to the receiver, which is connected with the brass plate $z\,y$, fig. 4, from which it passes to the siphon, as described.

The inductor E, fig. 5, for the good working of the machine, should be kept electrified to a high and constant potential. This is effected by an adjunct called the replenisher. The replenisher is similar in shape and general arrangement to the inductor, but two contact springs are added, as shown in fig. 6, and the connections are differently arranged.

Two of the springs C C, called receiving-springs, are connected to inductors E and D, and two springs B B, called connecting-springs, are joined together by a wire. The carrier touches the receiver-spring when wholly covered by the corresponding inductor. It touches the connecting-spring shortly after breaking contact with the receiver spring, and while still in great part covered by the inductor.

The action of the arrangement may be described as follows:

Let one inductor, E, be in connection with the earth; let the connecting-springs, with the wire joining them, be insulated, and the other inductor, D, electrified positively and connected with the other inductor, E, of the induction-machine, fig. 5; let the axis and carriers be turned rapidly in the direction shown by the arrows, each carrier after passing the contact C, and while in contact with $b$, will receive a negative charge by induction, while contact-spring $b$, and the carrier with which it is in contact, will at the same moment receive a positive charge, these effects being produced by the redistribution of the electricity in the insulated system composed of two carriers, the connecting-springs and wires under the influence of induction.

Immediately afterward contact is broken at $b$ and $b$, so that the two carriers retain their positive and negative charges until connected with the inductors by the springs $c$ and $c$; then the negative charge will go to earth through E, and the positive charge will leave the carrier inside D to distribute itself on the outer surface of D, in accordance with the well-known laws of induction. The repetition of this action leads to an indefinite accumulation of positive electricity on D, limited only by the perfection of its insulation, preventing the dispersion of the charge by conduction or by sparks. The charges of positive and negative electricity are indicated by the signs $+$ and $-$ on the carriers.

When discharged, or nearly discharged, an O is written on the carriers.

In the end view, fig. 6, the inductor E is removed to show the wheel and carriers. When the recording-instrument is at work the brass plate and paper crossing it, being highly charged with statical electricity, attract the end of the siphon, and, under the influence of this attraction, and of a rapid vibration produced in the end of the siphon, and which is due to continual small electrical discharges, the ink flies in a succession of fine drops from the siphon to the paper. These drops blend into a continuous line on the paper as it is drawn regularly forward. This line records the position of the end of the siphon at each moment as it is moved backward and forward across the paper by the silk fiber $r m$, attached to the side $m n$ of the receiving-coil. The line drawn on the paper is therefore a continuous curve corresponding to the motions of the side $m n$ of the receiving-coil, and therefore to the varying currents producing the motions and to the signals which those currents indicate. When no current is received a simple straight line will be drawn along the paper; short, positive, and negative signals will draw small ripples on either side of the zero-line.

Figure 7 shows the letters $a$ $b$ $c$ as drawn by the instrument according to the Steinheil code.

Earth-currents will cause the siphon to make long sweeps from side to side on the paper, causing curves of small curvature, on which are superimposed the comparatively short curves of the signals. In fine, the instrument is adapted to record all signals which can be read on my reflecting galvanometer.

A spring or other adjustment may be used to bring the paper and the siphon into such a relative position that the marks may be near the center of the paper and the sensibility of the new recorder is such that the current from a single Daniell's cell passing through a resistance of eight thousand ohms (equal to the resistance of the whole Atlantic Cable) will produce a perfectly distinct signal, while the resistance of the coil in the instrument itself need not exceed twenty ohms.

To multiply the power, when required, I use two or more light movable coils, each attached to the marking-needle by a connecting-fiber or fibers, which may be attached to the marking-needle near its axis, so as to magnify the motion of the marking-end as compared with that of the receiving-coils. The magnification may be pushed further, if desired, by using a multiplying train of two or more needles.

Mechanical vibrations may be maintained in the long leg of the siphon by sound instead of by electrical discharges. Thus the siphon may be attached by a single fiber to the end of a tuning-fork in vibration, the fiber being in a direction perpendicular to that in which the motions corresponding to the signals take place, does not injuriously impede those motions, but, on the contrary, may be used to give or adjust the directing-force. Instead of a tuning-fork, a spring set in vibration by an indented wheel, or a plate set vibrating by the air in a pipe sounding a note, as in an organ-pipe, might be used to give the small vibrations which jerk the ink from the end of the siphon to the paper. The ink-drop at the end of the siphon may touch the paper at the end of each vibration. The necessary vibrations might also be given from the paper itself, but I have obtained the best results in the manner above described at length.

The recording mechanism might be attached to the common single needle instrument, or the receiving-coil and magnet might be used as a relay or single-needle instrument independently of the recording instrument.

I claim as my invention of improvements in receiving or recording instruments for electric telegraphs.

1. The general arrangement of apparatus, substantially as described.
2. The capillary or small ink-siphon, kept in rapid vibration, substantially as described.
3. The arrangement of such apparatus so that an electric discharge may pass between the siphon and the surface to be marked, and so set up the requisite vibrations.
4. The arrangement of the receiving-coil, consisting of a small number of turns of fine wire suspended between strained threads or fibers in such a position that part of the coil is situate in a powerful magnetic field, substantially as described.

WILLIAM THOMSON.

Witnesses:
G. F. WARREN,
WILMER M. HARRIS.
} *Both of No. 17 Gracechurch street, London.*